United States Patent [19]

Britton

[11] 4,258,138

[45] Mar. 24, 1981

[54] METHOD OF FOAMING THERMOPLASTIC POLYMERIC MATERIALS USING TETRAZOLE-CONTAINING HETEROCYCLES

[75] Inventor: Thomas C. Britton, Portage, Mich.

[73] Assignee: The Dow Chemical Company, Midland, Mich.

[21] Appl. No.: 84,966

[22] Filed: Oct. 15, 1979

[51] Int. Cl.$^3$ .............................................. C08J 9/10
[52] U.S. Cl. ................................... 521/90; 521/128; 521/143; 521/146; 521/147; 521/184; 521/189; 544/234; 544/346
[58] Field of Search ................. 521/90, 128, 143, 147; 544/234, 346

[56] References Cited

U.S. PATENT DOCUMENTS

| | | | |
|---|---|---|---|
| 3,338,915 | 8/1967 | Brown | 521/90 |
| 3,366,581 | 1/1968 | Reed | 521/90 |
| 3,442,829 | 5/1969 | Moore et al. | 521/90 |
| 4,097,421 | 6/1978 | Chang | 521/90 |
| 4,127,718 | 11/1978 | Illy et al. | 521/90 |
| 4,158,724 | 6/1979 | Illy et al. | 521/90 |

*Primary Examiner*—Morton Foelak
*Attorney, Agent, or Firm*—R. B. Ingraham

[57] ABSTRACT

Method of foaming thermoplastic polymeric materials using as blowing agents polycyclic fused ring heterocycles containing the tetrazole moiety.

12 Claims, No Drawings

METHOD OF FOAMING THERMOPLASTIC POLYMERIC MATERIALS USING TETRAZOLE-CONTAINING HETEROCYCLES

BACKGROUND OF THE INVENTION

1. Field of the Invention

A blowing agent is a chemical compound which decomposes on heating to a specific temperature to yield a vapor or gas or mixture of vapor and gas. In use, the blowing agent is incorporated in the thermoplastic material at a temperature below the decomposition temperature of the blowing agent and the mixture subsequently heated to a temperature above the decomposition temperature of the blowing agent whereupon the blowing agent decomposes to liberate a gas or vapor which forms small voids within the thermoplastic material. It is important that the blowing agent be finely and homogeneously dispersed within the thermoplastic material.

An important characteristic of a blowing agent is the temperature at which it decomposes to liberate gas or vapor since this temperature limits the temperature at which other operations may be performed on the thermoplastic material after incorporation of the blowing agent, but before actual formation of the cellular product. It is, therefore, often convenient to employ a blowing agent having a relatively high temperature of decomposition, this being especially the case when forming cellular products of thermoplastic material having relatively high fusion temperatures.

It is well known that the decomposition of a blowing agent should not occur until the processing temperature has been reached. The desired gas evolution should occur, however, prior to completion of the processing in order to produce a blown product of consistent density and also a minimum density for the blowing agent used. Also, the blowing agent should not react with or reduce the performance of any additives that are utilized in the processing of the materials being expanded.

Many of the blowing agents utilized in preparing cellular rubber or thermoplastic materials were unsatisfactory for use with materials such as polypropylene, polysulfonate, polysulfone, polyethylene oxide, polycarbonate and acrylonitrile-butadiene-styrene (ABS) due to the high temperatures required in processing these materials. Due to the fact that the processing temperatures on these materials were quite high, i.e., in the area of 100° to 250+° C. the blowing agents used prior to this invention had a tendency to become unstable prior to reaching the processing temperature and did not allow even distribution of the blowing agent nor uniformity of cell formation within the thermoplastics or thermoplastic blends.

2. Description of the Prior Art

Several patents disclose the use of compounds containing the tetrazole moiety as blowing agents. U.S. Pat. No. 3,366,581 discloses 5-hydroxytetrazole as a blowing agent for thermoplastic resins specifically claiming its use for polypropylene, high density polyethylene, polyamide, acrylonitrile-butadiene-styrene, and high temperature siloxane polymers. U.S. Pat. No. 3,442,829 discloses the use of 5-alkyl, cycloalkyl, arylalkyl, phenyl, and substituted phenyl tetrazoles in expanding a variety of high temperature processing resins. German Offenlegungsschrift No. 2,506,775 discloses the use of tetrazolylphthalimides in expanding polycarbonates and acrylonitrile-butadiene-styrene.

SUMMARY OF THE INVENTION

The present invention is directed to a method for the production of expanded resinous material which comprises incorporating into a thermoplastic polymeric resinous material polycyclic tetrazole-containing fused ring heterocycle blowing agents of the formula

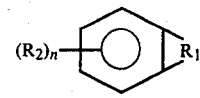

wherein $R_1$ is a radical selected from the group consisting of

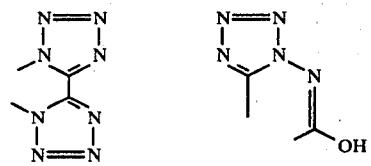

and $R_2$ is one or more members of the group consisting of hydrogen and the lower alkyls ($C_1$–$C_6$) wherein n is an integer from 1 to 5.

Included within the scope of this invention is the expandable resinous composition comprising thermoplastic polymeric resinous material having dispersed therein less than 5 percent by weight of polycyclic tetrazole-containing fused ring heterocycle blowing agents of the formula

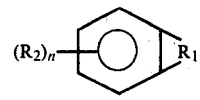

wherein $R_1$ is a radical selected from the group consisting of

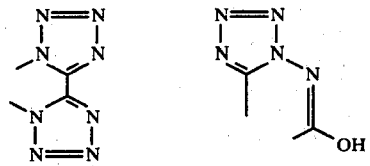

and $R_2$ is one or more members of the group consisting of hydrogen and the lower alkyls ($C_1$–$C_6$) wherein n is an integer from 1 to 5.

Also included within the scope of this invention is the expanded resinous structure comprising thermoplastic polymeric resinous material having dispersed therein less than 5 percent by weight of polycyclic tetrazole-containing fused ring heterocycle blowing agents of the formula

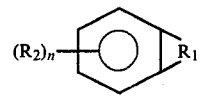

wherein $R_1$ is a radical selected from the group consisting of

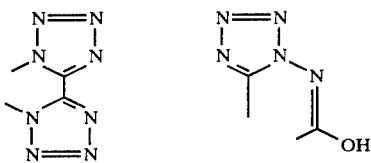

and $R_2$ is one or more members of the group consisting of hydrogen and the lower alkyls ($C_1$-$C_6$) wherein n is an integer from 1 to 5.

DETAILED DESCRIPTION OF THE INVENTION

According to the invention, there is provided a method for the preparation of expanded resinous material which comprises incorporating one or more of the tetrazole-containing fused ring heterocycle blowing agents of this invention into said resinous material at a temperature below the decomposition temperature of the blowing agents and subsequently heating the mixture of a temperature above the decomposition temperature of the blowing agents. The blowing agents of this invention provide a sufficiently high decomposition temperature to allow processing to occur at temperatures between 100° to 250+° C. with uniform evolution of gas or vapor and production of substantially uniform density-foamed products.

As pointed out above, the blowing agents should be incorporated in the resinous material in a finely divided and homogeneous manner. This may conveniently be effected in the present case by tumbling the blowing agents in a powder form with individual particles of a size less than 200 mesh, with granules of the desired resinous material. Other methods of incorporation of blowing agents in resinous materials are known in the art and may be employed, for example, dry powder tumbling/metering, metered liquid dispersions or by using resin concentrates. Other agents, such as kickers, other blowing agents and diluents may also be used with the blowing agents of this invention, i.e., such as are disclosed in "Blowing Agents" by Henry R. Lasman, *Encyclopedia of Polymer Science and Technology*, pages 532–565, Interscience Publishers, New York (1965).

The relatively high decomposition temperatures of the tetrazole-containing fused ring heterocycle blowing agents of this invention render them particularly suitable for use with thermoplastic materials having relatively high fusion temperatures. Thus, for example, the blowing agents of this invention may be employed with the so-called thermoplastic engineering resins such as polycarbonates, polysulfones, polyphenylene oxides, high impact polystyrene, high density polyethylene, polypropylene, nylon, acrylonitrile-butadienestyrene resins and high temperature siloxane polymers.

The amount of blowing or expanding agents employed depends to some extent upon the degree of blowing or expansion required. In general, however, amounts of less than 5 percent by weight, i.e., about 2 percent based on the weight of resinous material, prove satisfactory. If the heating of the mixture is to be effected in an extruder, then the amount of blowing agent may be less; e.g., as low as 0.5 percent by weight or less.

Blowing agents useful in the present invention are prepared by refluxing an appropriate 1,4-dichlorophthalazine with sodium azide in alcohol. The resultant precipitate is recovered, washed and dried. The dried product is then refuxed with alcoholic sodium hydroxide, acidified with dilute $H_2SO_4$, heated to remove the $HN_3$, then concentrated, filtered and washed to produce the resultant, 6-hydroxytetrazolo[5,1-a]phthalazine derivative.

Ditetrazolo[a,c]quinoxaline blowing agents can be prepared by refluxing an appropriate 2,3-dichloroquinoxaline with sodium azide in alcohol, then filtering and washing the ditetrazolo[a,c]quinoxaline derivative product.

A preferred embodiment of the present invention is the blowing agent, 6-hydroxytetrazolo[5,1-a]phthalazine. This compound was prepared as follows: a mixture of 5.0 grams of commercially available 1,4-dichlorophthalazine and 5.0 grams of sodium azide in 300 milliliters of absolute ethanol was stirred and refluxed for ~4 hours. The mixture was filtered while hot, and the filtrate was allowed to concentrate to a volume of 100–150 milliliters. The resulting precipitate was collected, washed with a small amount of absolute ethanol, washed with water and air dried to yield 4.2 grams of off-white solid. A mixture of 3.2 grams of this intermediate product, 5.2 milliliters of 50 percent aqueous sodium hydroxide (NaOH) and 100 milliliters of absolute ethanol was stirred and refluxed for 22 hours. The mixture was acidified with about 50 milliliters of 20 percent $H_2SO_4$, heated on a steam bath to remove the $HN_3$, then concentrated in vacuo in a rotary evaporator. When essentially all of the ethanol was removed, the remaining slurry was filtered and the resultant solid was washed several times with cold water. After air drying, the solid 6-hydroxytetrazolo[5,1-a]phthalazine weighed 2.72 grams and had a melting and decomposition temperature of 273° C.

A second preferred embodiment of the present invention is the blowing agent, ditetrazolo[a,c]quinoxaline. The compound was prepared as follows: a mixture of 15.0 grams of commercially available 2,3-dichloroquinoxaline, 13.5 grams of sodium azide and 300 milliliters of absolute ethanol was stirred and refluxed for 17 hours. The mixture was then cooled with an ice bath and the solid product was collected and washed once with cold absolute ethanol, several times with cold water, then air dried to yield 15.15 grams of off-white solid with a melting point of 262° C. The product was purified by extraction for about 72 hours into ethanol in a Soxhlet extractor. The ethanol extract was cooled, and precipitate was collected, filtered, and again washed with absolute ethanol, and air dried to yield 12.44 grams of ditetrazolo[a,c]quinoxaline with a melting and decomposition temperature of 270° C.

The present invention relates to improvements in or relating to blowing agents, more particularly, to the use of polycyclic, fused-ring heterocycles containing the tetrazole moiety and also the expandable and expanded compositions resulting from the present invention.

The following examples illustrate the invention but are not to be construed as limiting its scope.

In the examples, formulations of one percent of the particular blowing agent in rubber-reinforced high impact polystyrene containing about 7 percent of a reinforcing rubber and in high density polyethylene having a density of about 0.965 and a melt index of about 1 were compounded on a two-roll compounding mill at a temperature below the blowing agent decomposition temperature. The formulations of 1 percent blowing agent in polycarbonate were blended at 200° C. for 5 minutes in a Banbury compounder. All formulations were expanded in an air circulating oven.

The following tables show the percentage of expansion of the formulations expressed as percent increase over the original volume upon heating for the specified times, i.e.

$$\frac{\text{Volume of Foam} + \text{Volume of Solid}}{\text{Volume of Solid}} \times 100 = \% \text{ Expansion}$$

EXAMPLE 1

Percent expansion of the formulation of 1 percent by weight 6-hydroxytetrazolo[5,1-a]phthalazine in high impact polystyrene is indicated in Table I below.

TABLE I

| Oven Temperature (°C.) | Expansion Time | | | |
|---|---|---|---|---|
| | 2 min | 4 min | 6 min | 8 min |
| 200 | 0% | 14% | 16% | 22% |
| 225 | 55% | 132% | 150% | 200% |
| 250 | 160% | 260% | 300% | 320% |
| 275 | 220% | 250% | 210% | — |

EXAMPLE 2

Percent expansion of the formulation of 1 percent by weight 6-hydroxytetrazolo[5,1-a]phthalazine in high density polyethylene is indicated in Table II below.

TABLE II

| Oven Temperature (°C.) | Expansion Time | | | |
|---|---|---|---|---|
| | 2 min | 4 min | 6 min | 8 min |
| 200 | 0% | 10% | 10% | 2% |
| 225 | 5% | 10% | 70% | 76% |
| 250 | 0% | 104% | 188% | 154% |
| 275 | 20% | 180% | 130% | — |

EXAMPLE 3

Percent expansion of the formulation of 1 percent by weight ditetrazolo[a,c]quinoxaline in high impact polystyrene is indicated in Table III below.

TABLE III

| Oven Temperature (°C.) | Expansion Time | | | |
|---|---|---|---|---|
| | 2 min | 4 min | 6 min | 8 min |
| 200 | 15% | 18% | 15% | 18% |
| 225 | 12% | 138% | 208% | 192% |
| 250 | 170% | 218% | 135% | 42% |

EXAMPLE 4

Percent expansion of the formulation of 1 percent by weight ditetrazolo[a,c]quinoxaline in high density polyethylene is indicated in Table IV below.

TABLE IV

| Oven Temperature (°C.) | Expansion Time | | | |
|---|---|---|---|---|
| | 2 min | 4 min | 6 min | 8 min |
| 200 | 0% | 0% | 0% | 12% |
| 225 | 8% | 66% | 106% | 106% |
| 250 | 10% | 104% | 72% | 72% |

EXAMPLE 5

Percent expansion of the formulation of 1 percent by weight 6-hydroxytetrazolo[5,1-a]phthalazine in polycarbonate, commercially available as Merlon 39 from Mobay Chemical Company, is indicated in Table V below.

TABLE V

| Oven Temperature (°C.) | Expansion Time | | | |
|---|---|---|---|---|
| | 2 min | 4 min | 6 min | 8 min |
| 250 | 6% | 25% | 92% | 150% |
| 275 | — | 70% | 150% | 156% |
| 300 | 30% | 150% | 167% | — |

What is claimed is:

1. A method for the production of expanded resinous material which comprises incorporating into a thermoplastic polymeric resinous material polycyclic, tetrazole-containing, fused ring heterocycle blowing agents of the formula

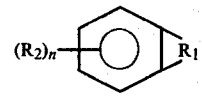

wherein $R_1$ is a radical selected from the group consisting of

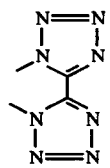 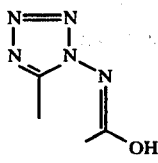

and $R_2$ is one or more members of the group consisting of hydrogen and the lower alkyls ($C_1$–$C_6$) wherein n is an integer from 1 to 5.

2. The method of claim 1 wherein said thermoplastic polymeric resinous material is one or more of the group consisting of polycarbonate, polysulfones, polyphenylene oxides, high impact polystyrene, high density polyethylene, polypropylene, nylon, acrylonitrile-butadiene-styrene resins and high temperature siloxane polymers.

3. The method of claims 1 or 2 wherein said blowing agent is 6-hydroxytetrazolo[5,1-a]phthalazine.

4. The method of claims 1 or 2 wherein said blowing agent is ditetrazolo[a,c]quinoxaline.

5. An expandable resinous composition comprising thermoplastic polymeric resinous material having dispersed therein less than 5 percent by weight of polycyclic tetrazole-containing fused ring heterocycle blowing agents of the formula

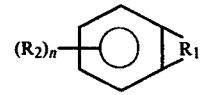

wherein $R_1$ is a radical selected from the group consisting of

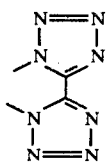 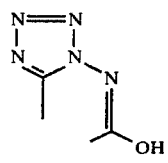

and $R_2$ is one or more members of the group consisting of hydrogen and the lowr alkyls ($C_1$–$C_6$) wherein n is an integer from 1 to 5.

6. The expandable resinous composition of claim 5 wherein said thermoplastic polymeric resinous material is selected from the group consisting of polycarbonate, polysulfones, polyphenylene oxides, high impact polystyrene, high density polyethylene, polypropylene, nylon, acrylonitrile-butadiene-styrene resins and high temperature siloxane polymers.

7. The expandable resinous composition of claims 5 or 6 wherein said blowing agent is 6-hydroxytetrazolo[5,1-a]phthalazine.

8. The expandable resinous composition of claims 5 or 6 wherein said blowing agent is ditetrazolo[a,c]quinoxaline.

9. An expanded resinous structure comprising thermoplastic polymeric resinous material having dispersed therein less than 5 percent by weight of polycyclic tetrazole-containing fused ring heterocycle blowing agent of the formula

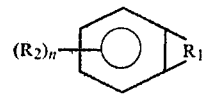

wherein $R_1$ is a radical selected from the group consisting of

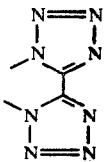 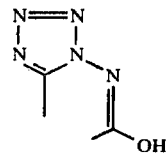

and $R_2$ is one or more members of the group consisting of hydrogen and the lower alkyls ($C_1$–$C_6$) wherein n is an integer from 1 to 5.

10. The expanded resinous structure of claim 9 wherein said thermoplastic polymeric resinous material is selected from the group consisting of polycarbonate, polysulfones, polyphenylene oxides, high impact polystyrene, high density polyethylene, polypropylene, nylon, acrylonitrile-butadiene-styrene resins and high temperature siloxane polymers.

11. The expanded resinous structure of claims 9 or 10 wherein said blowing agent is 6-hydroxytetrazolo[5,1-a]phthalazine.

12. The expanded resinous structure of claims 9 or 10 wherein said blowing agent is ditetrazolo[a,c]quinoxaline.

* * * * *